(12) United States Patent
Walden et al.

(10) Patent No.: US 12,270,235 B2
(45) Date of Patent: *Apr. 8, 2025

(54) COUNTERBALANCE HINGE ASSEMBLY

(71) Applicant: Austin Hardware & Supply, Inc., Lee's Summit, MO (US)

(72) Inventors: Robert Walden, Buford, GA (US); David Lay, Buford, GA (US); Daye Zhang, Buford, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 293 days.

This patent is subject to a terminal disclaimer.

(21) Appl. No.: 18/089,106

(22) Filed: Dec. 27, 2022

(65) Prior Publication Data

US 2023/0125735 A1   Apr. 27, 2023

Related U.S. Application Data

(63) Continuation-in-part of application No. 17/855,041, filed on Jun. 30, 2022.

(60) Provisional application No. 63/217,468, filed on Jul. 1, 2021.

(51) Int. Cl.
*E05D 13/00* (2006.01)
*B60P 1/43* (2006.01)

(52) U.S. Cl.
CPC ............ *E05D 13/123* (2013.01); *B60P 1/438* (2013.01); *E05Y 2201/474* (2013.01)

(58) Field of Classification Search
CPC .............. E05D 13/123; E05D 13/1238; E05D 13/1246; E05Y 2201/474; E05Y 2201/638; E05Y 2900/516; E05F 1/10; E05F 1/1008; E05F 1/1025; E05F 1/1083; E05F 1/1091; E05F 1/1207; E05F 1/1223; E05F 1/1284; E05F 1/1292; B60P 1/438
USPC ......... 16/306, 298, 284, 296, 303, 312, 313, 16/314, 315, 316, 317, 318, 290; 296/146.11, 61

See application file for complete search history.

(56) References Cited

U.S. PATENT DOCUMENTS 3,401,422 A * 9/1968 Ventura .................. E05F 1/061
16/54
3,955,241 A * 5/1976 Little .................... E05F 1/1223
49/237

(Continued)

FOREIGN PATENT DOCUMENTS

| EP | 2030873 A2 | 3/2009 | |
| EP | 1485564 B1 * | 4/2010 | ............ E05D 15/24 |
| WO | WO-2008103698 A1 * | 8/2008 | ............ E05F 1/1215 |

OTHER PUBLICATIONS

UK Search Report for Application No. GB2216588.0 dated May 12, 2023, 5 pages.

*Primary Examiner* — Jeffrey O'Brien
(74) *Attorney, Agent, or Firm* — Polsinelli PC

(57) ABSTRACT

A counterbalance hinge assembly includes a cam and compression device that counterbalances a weight of a door or a ramp. The compression device biases against a rotation of the door or ramp. The downward movement of the door or ramp drives cam followers in angled slots or cam surfaces of the cam. The angled slots or cam surfaces include varying angles of incline to correspond to varying torque forces of the door or ramp during the opening or closing movement of the door or ramp.

21 Claims, 13 Drawing Sheets

(56) References Cited

U.S. PATENT DOCUMENTS

| | | | | |
|---|---|---|---|---|
| 4,657,233 | A | * | 4/1987 | Vroom .................... B60P 1/438 |
| | | | | 267/155 |
| 5,970,819 | A | * | 10/1999 | Katoh .................... H04M 1/02 |
| | | | | 16/322 |
| 7,261,356 | B1 | * | 8/2007 | Taylor .................... B60P 1/435 |
| | | | | 49/386 |
| 7,699,378 | B2 | * | 4/2010 | Smith ................... E05F 1/1223 |
| | | | | 49/386 |
| 8,136,204 | B2 | * | 3/2012 | Ohno .................... E05D 11/08 |
| | | | | 16/85 |
| 8,186,015 | B2 | * | 5/2012 | Attride ............... H04M 1/0216 |
| | | | | 16/303 |
| 8,505,166 | B2 | * | 8/2013 | Mitchell ................ E05F 1/066 |
| | | | | 16/315 |
| 8,556,330 | B2 | * | 10/2013 | Lazarevich ........... E05D 7/1005 |
| | | | | 16/334 |
| 8,621,714 | B2 | * | 1/2014 | Duan .................. H04M 1/0216 |
| | | | | 16/303 |
| 9,739,523 | B1 | * | 8/2017 | Augsburger ............. E05D 3/02 |
| D1,048,857 | S | * | 10/2024 | Walden .......................... D8/343 |
| 2005/0139331 | A1 | * | 6/2005 | O'Malley ........... E05D 13/1261 |
| | | | | 160/191 |
| 2008/0201903 | A1 | * | 8/2008 | Sovis .................... E05F 1/1215 |
| | | | | 16/277 |
| 2009/0058131 | A1 | * | 3/2009 | Smith .................... B62D 33/03 |
| | | | | 296/146.11 |
| 2010/0162526 | A1 | * | 7/2010 | Duan .................. H04M 1/0216 |
| | | | | 16/303 |
| 2012/0272481 | A1 | * | 11/2012 | Ahn .................... H04M 1/0216 |
| | | | | 16/386 |
| 2015/0145397 | A1 | * | 5/2015 | Chin .................... F24C 15/023 |
| | | | | 312/319.3 |

* cited by examiner

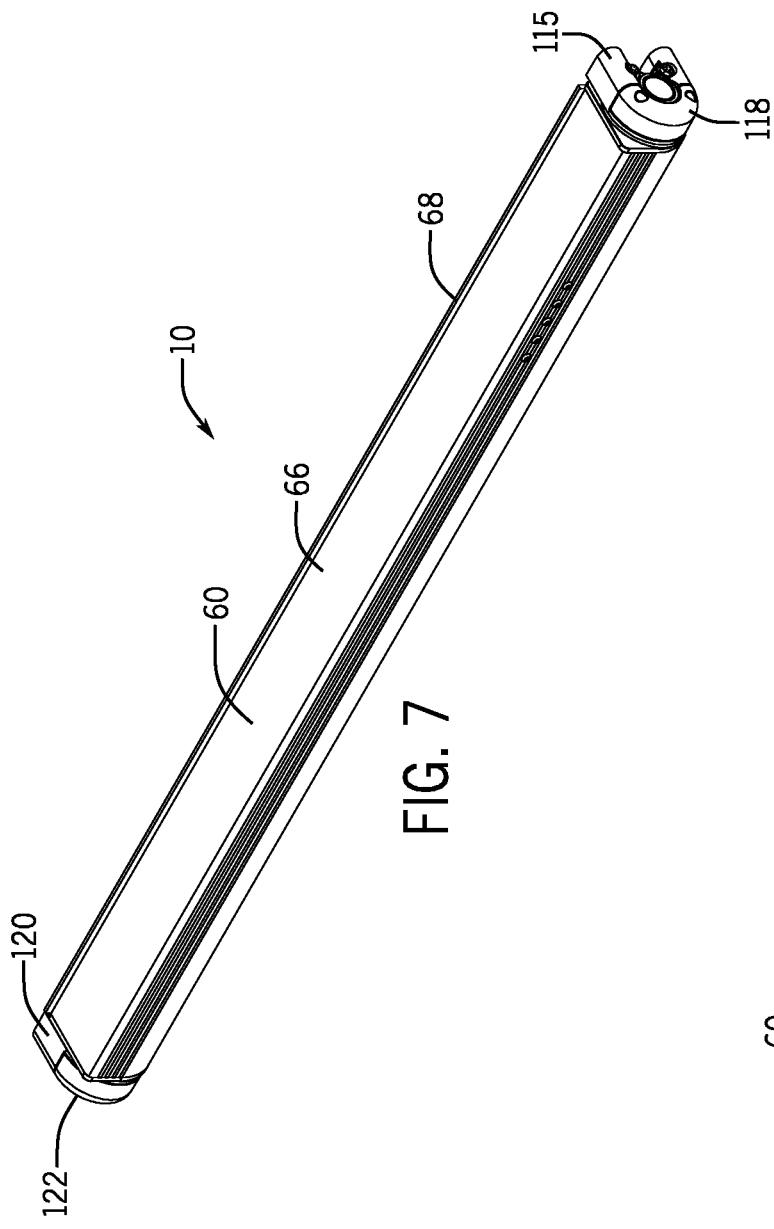
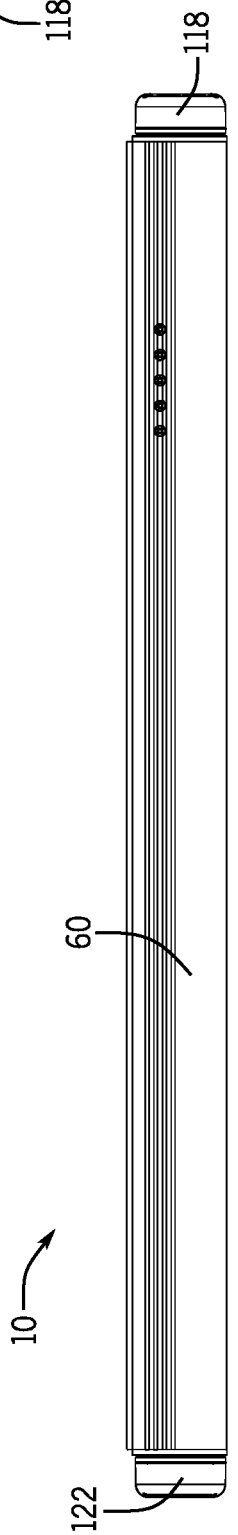
FIG. 7
FIG. 8

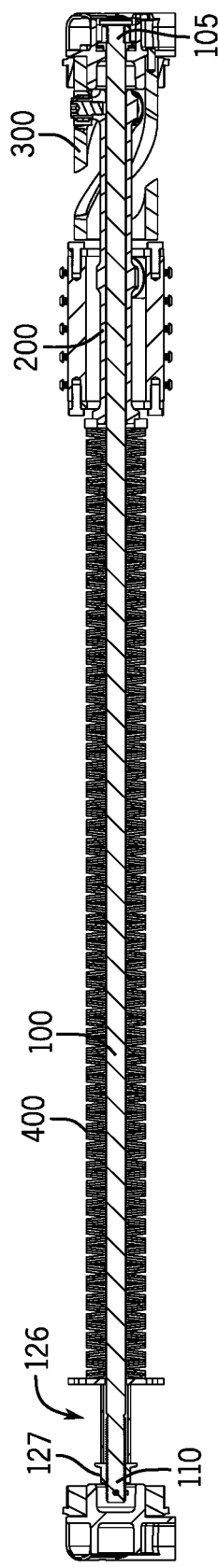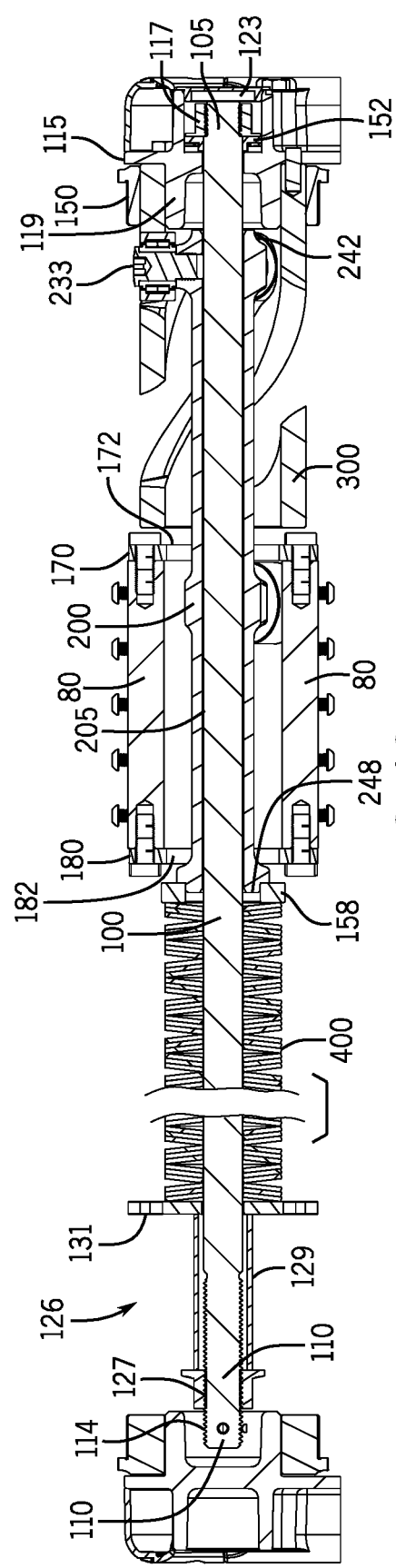

COUNTERBALANCE HINGE ASSEMBLY

This application is a continuation in part of U.S. patent application Ser. No. 17/855,041 filed Jun. 30, 2022, which claims priority to U.S. Provisional Patent Application No. 63/217,468 filed Jul. 1, 2021, which are both incorporated by reference.

FIELD OF INVENTION

The present invention relates to a counterbalance hinge assembly that assists in the opening and closing of ramps, platforms, doors, and other structures.

BACKGROUND OF INVENTION

Delivery trucks, work trucks, trailers, recreational vehicles, toy haulers, campers, etc. often have ramps, platforms, doors, and other structures that are raised to a stowed or storage position and lowered to a deployed position. For example, a ramp may be used on a toy hauler such that an operator may drive a motorcycle, car, utility vehicle, etc. over the ramp and directly into a storage bay of the toy hauler. Often, such ramps may weigh several hundred pounds or more. When deploying the ramp from a vertical storage position, the ramp may be initially easy to hold up, but the ramp will begin to accelerate by gravity as the ramp is lowered. This may cause injury or damage. When lifting a ramp from the deployed position to the stowed position, the ramp may be difficult to raise due to the weight of the ramp.

Existing technology may use cables, winches, motors, etc. to lower and raise the ramps. Such technology may be burdensome to operate, provide a tripping hazard, or possibly hinder access by blocking a portion of the ramp.

SUMMARY OF INVENTION

The counterbalance hinge assembly includes a cam and compression device that counterbalances a weight of a door or a ramp. The compression device biases against a rotation of the door or ramp. The movement of the door or ramp drives cam followers of a cam follower holder against the cam. The counterbalance hinge assembly lessens a force needed to move the door or ramp between stowed and deployed positions.

The counterbalance hinge assembly may be used with a variety of moveable members, such as, for example, ramps, platforms, doors, and other structures. The counterbalance hinge assembly allows the operator to deploy or stow such a ramp with minimal force. The counterbalance hinge assembly may be integrated into delivery trucks, work trucks, trailers, recreational vehicles, toy haulers, campers, etc. The counterbalance hinge assembly generally buffers or counterbalances a torque caused by the rotational movement of the ramp, platform, door, or other structure in the opening direction. In a closing direction, stored energy from the compression device helps to raise the ramp, platform, door, or other structure. The counterbalance hinge assembly at least partially supports or buffers a weight of the ramp, platform, door, or other structure making it easier for the user to move the ramp or platform.

In one application, the counterbalance hinge assembly may be used on a platform or deck of a toy hauler. The platform may include deployable footings that provide for the ramp to deploy generally parallel to the ground and serve as a deck or an elevated observation platform.

In other applications, a single trailer may employ multiple counterbalance hinge assemblies in different positions. For example, the single trailer may include a ramp at a rear of the trailer deployed with a first counterbalance hinge assembly and the single trailer may include a deck or platform on a side of the same trailer deployed with a second counterbalance hinge assembly.

The counterbalance hinge assembly requires minimal effort in both deploying or stowing of a ramp or platform. The counterbalance hinge assembly provides assistance when moving the ramp or platform upwards and downwards. The counterbalance hinge assembly also provides several benefits. The counterbalance hinge assembly does not require exposed cables, winches, or other devices that interfere with side access or egress of the ramp, which may form a possible tripping hazard.

As described above, the counterbalance hinge assembly may be used with a variety of ramps, platforms, doors, and other structures. The counterbalance hinge assembly may be used with a small deck (platform) or larger ramps, such as a full-size ramp door. The counterbalance hinge assembly is not limited to a particular type or size of ramp or platform.

The operation of the counterbalance hinge assembly provides for a weight of the ramp or platform to be minimized during the deploying or stowing of the ramp or platform. An operator may only need to apply a minimal pulling force, such as provided by a single finger of the operator, to begin to move the ramp or platform from the fully stowed position to a fully deployed position. Further, the counterbalance hinge assembly provides for the ramp or platform to move from the fully stowed position to the fully deployed position at a controlled rate, i.e., the ramp or platform does not generally fall to the fully deployed position at a rate that could injure the operator or damage the ramp or platform.

Likewise, when the ramp or platform is in a fully deployed position, an operator may only need to apply a minimal lifting force, such as provided by a single finger of the operator, to begin to move the ramp or platform from the fully deployed position to a fully stowed position. This is especially helpful when moving the ramp or platform to the fully stowed position, as the ramp or platform may weigh several hundred pounds or more.

The counterbalance hinge assembly includes adjustable operation to work with different sizes of ramps and platforms and different applications in which additional or less closing or opening force is preferred to close or open the ramp or platform.

In one aspect, a downward movement of the door or ramp drives cam followers in angled slots of a cam. The angled slots include varying angles of incline to correspond to varying torque forces of the door or ramp during the opening or closing movement of the door or ramp.

The counterbalance hinge assembly provides for smooth operation. When the ramp or platform is fully stowed, the ramp or platform may be in a generally vertical alignment, and is in a generally neutral position with most of its weight balanced over the counterbalance hinge assembly. In order to begin moving the ramp or platform from the fully stowed position, minimal force is required. As the platform begins to move downward, the weight of the platform increases the opening force, but this weight is counterbalanced by the hinge assembly—and the platform does not fall in an uncontrolled manner.

The counterbalance hinge assembly is adjustable. The counterbalance hinge assembly may be adjusted to have neutral resistance while maintaining the ramp or platform in the stowed position (with a neutralizing force between the stowed and deployed directions), to possibly having a small amount of positive force applied to the stowed direction (to maintain stowed position) or a force just below the neutralizing force to allow the ramp to deploy a slight amount to a holding position until an external force is applied to either move the ramp to a deployed position or to put the ramp back to the fully stowed position. Alternatively, by adjusting the counterbalance hinge to have a slight positive force to move the ramp to the stowed position or to decrease the positive force allowing the ramp to deploy a slight amount when released from the stowed position by a securing or holding device.

Once the ramp has been released to deploy, the counterbalance hinge settings allow minimal force to move the ramp to the deployed direction. When returning the ramp to a stowed position from fully deployed, the force required to lift the ramp is a minimal amount or an acceptable % of the actual ramp weight so that it can be lifted easily by one person. Once the ramp is moved to approximately 90° or less it will be easier to lift to the stowed position.

As used herein, the moveable member may include a platform, door, decking, closure or other structure that moves up and down or in a vertical direction with a first side proximal to a hinge, pivot, or other movable connection and a second side distal from the hinge, pivot, or other movable connection.

In another aspect, the counterbalance hinge assembly includes a slot with a first slot end and a second slot end. The first slot end corresponds to a stowed position, and the second slot end corresponds to a deployed position. The slot has a varying angle of incline as the slot transitions from having a first angle of incline at the first slot end, to having a second angle of incline of between the first slot end and the second slot end, and to having a third angle of incline at the second slot end, wherein the second angle of incline is greater than both the first angle of incline and the second angle of incline.

In another aspect, the counterbalance hinge assembly includes a cam having a slot having sidewalls. The sidewalls comprise a first section of incline for a stowed configuration to a partially deployed configuration, a second section of incline for the partially deployed configuration, and a third section of incline for the partially deployed configuration to a deployed configuration.

In another aspect, the counterbalance hinge assembly includes a cam having a slot having sidewalls. The sidewalls form an angle of incline, which transitions from having a first incline, to having a second incline, and to having a third incline, wherein the second incline is greater than both the first incline and the second incline.

In another aspect, a counterbalance hinge assembly is described. The counterbalance hinge assembly includes a housing, a first fixed end support, and a second fixed end support. The housing is positioned between the first fixed end support and the second fixed end support. The housing is configured to rotate relative to the first fixed end support and the second fixed end support. A compression device is engaged to the housing. The compression device is configured to apply a bias to a rotation of the housing.

In another aspect, a counterbalance hinge assembly is described. The counterbalance hinge assembly includes a housing and a support. The housing is rotatably engaged to the support. The housing is configured to rotate in first and second directions relative to the support. A compression device is engaged to the housing. A rotation of the housing in the first direction transfers rotational torque to a linear force that compresses the compression device and stores energy in the compression device.

In another aspect, a counterbalance hinge assembly is described. The counterbalance hinge assembly includes a cam follower holder. The cam follower holder includes a first cam follower and a second cam follower. A compression device biases against the cam follower holder. The cam follower holder is configured to engage to a moveable member. A cam defines cam surfaces. The first cam follower is configured to impart a rotational force to the cam follower holder. The second cam follower is configured to drive against the cam surfaces of the cam to drive the cam follower holder against a bias of the compression device.

In another aspect, a counterbalance hinge assembly is described. The counterbalance hinge assembly includes a housing and a support. The housing is configured to rotate in first and second directions relative to the support. The counterbalance hinge assembly includes a cam follower holder. The cam follower holder includes a first cam follower and a second cam follower. A compression device biases against the cam follower holder. The counterbalance hinge assembly includes a cam that defines cam surfaces. The housing is configured to drive against the first cam follower and impart a rotational force to the cam follower holder. The second cam follower is configured to drive against the cam surfaces of the cam to drive the cam follower holder against a bias of the compression device.

BRIEF DESCRIPTION OF DRAWINGS

FIG. 7 is a perspective view of the counterbalance hinge assembly.

FIG. 8 is a front view of the counterbalance hinge assembly.

FIG. 12 is a sectional view of the counterbalance hinge assembly with the housing removed.

FIG. 13 is a sectional view of the counterbalance hinge assembly with the housing removed.

DETAILED DESCRIPTION OF INVENTION

Figure 1:
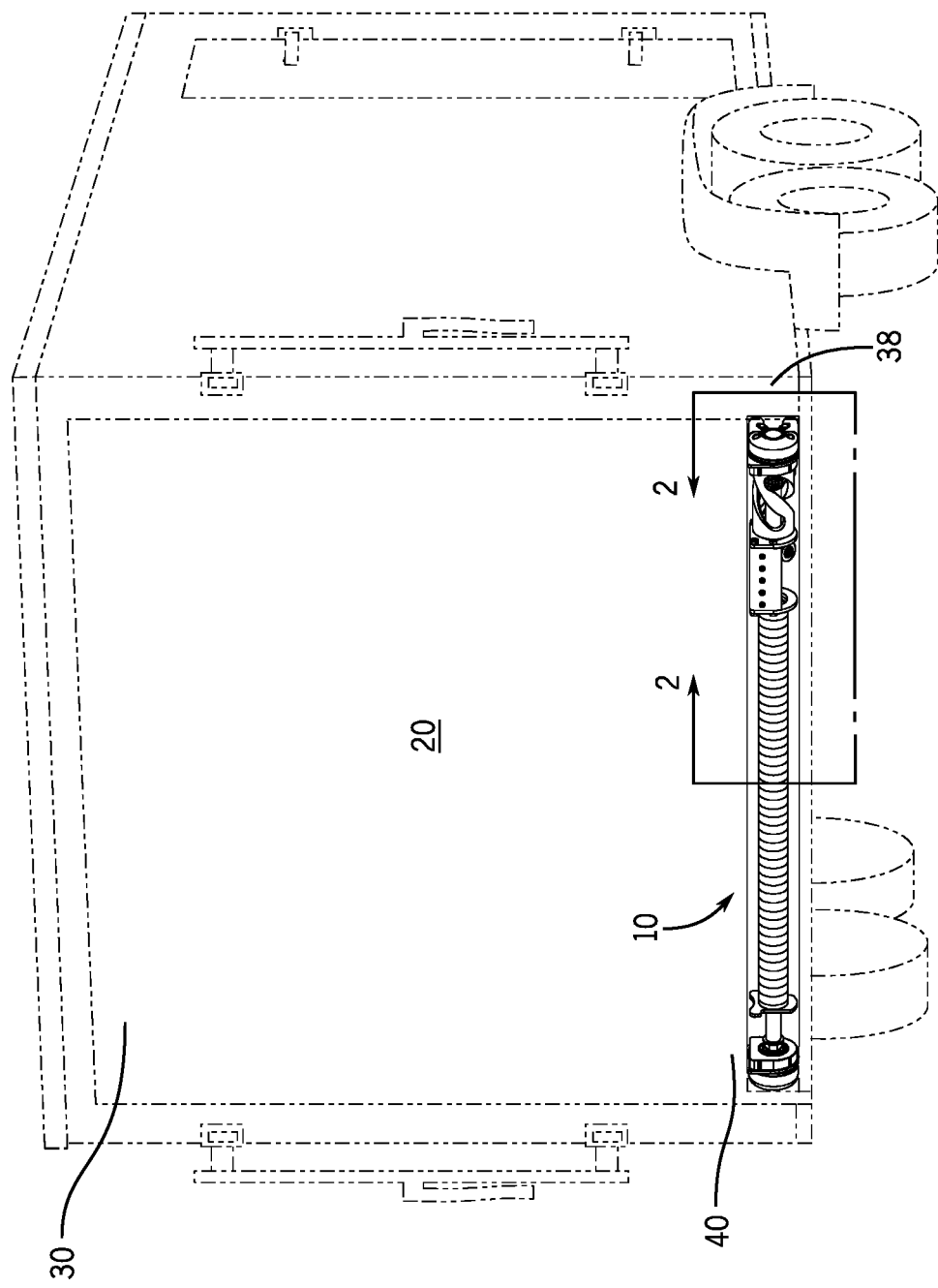
FIG. 1 is a view of the trailer with the ramp in the stowed position.

A counterbalance hinge assembly 10 will now be described with reference to FIGS. 1-21. In this aspect, the counterbalance hinge assembly 10 is engaged to a moveable member 20 and a rear end 38 of a trailer. With reference to FIG. 1, the moveable member 20 includes a distal side 30 and a proximal side 40 at the rear end 38 of the trailer. The proximal side 40 of the moveable member 20 is engaged to the counterbalance hinge assembly 10. The distal side 30 may touch the ground in a deployed position when the moveable member 20 is a ramp. The distal side 30 may be supported above the ground in a deployed position when the moveable member 20 is a deck or platform.

Figure 2:
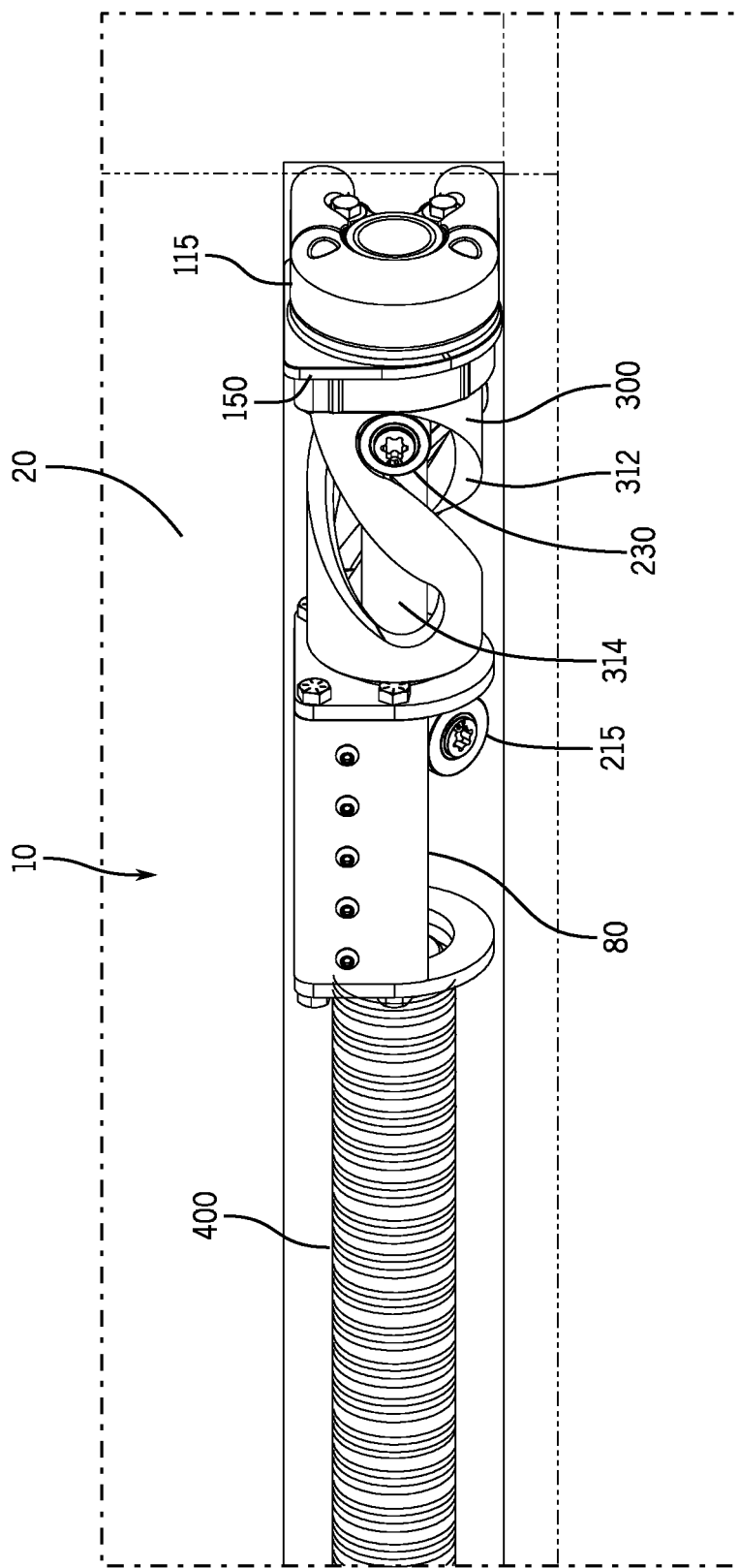
FIG. 2 is a view of the counterbalance hinge assembly.
Figure 3:
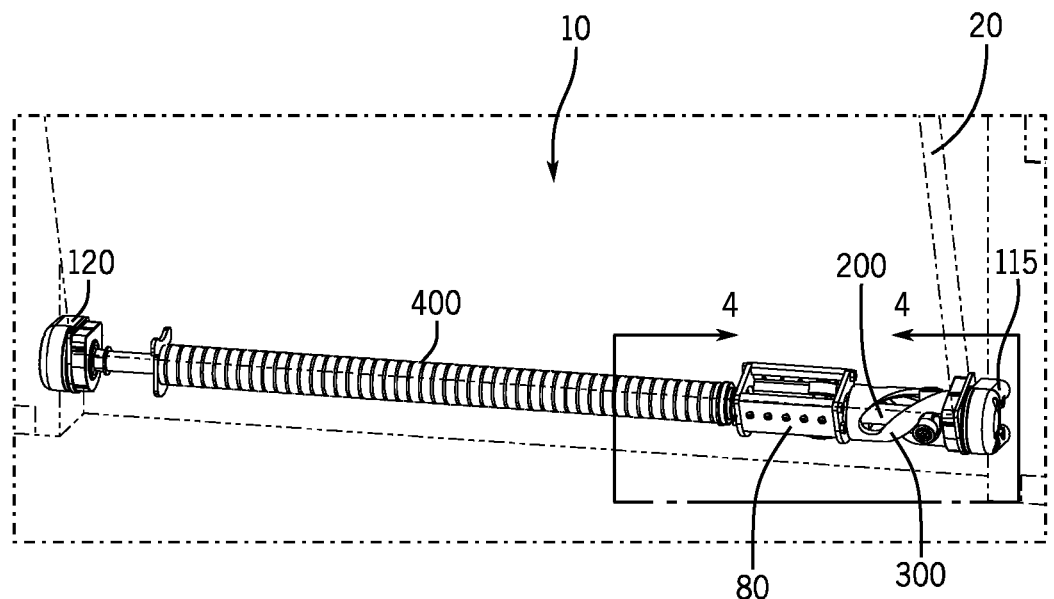
FIG. 3 is a view of the ramp partially deployed.
Figure 4:
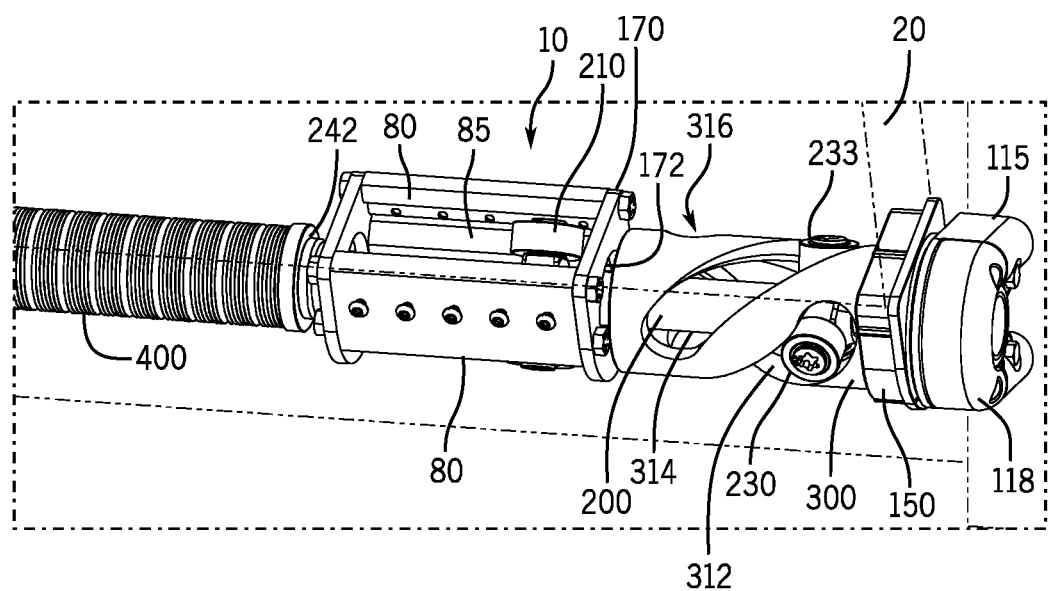
FIG. 4 is a view of the counterbalance hinge assembly of the trailer with the ramp partially deployed.
Figure 5:
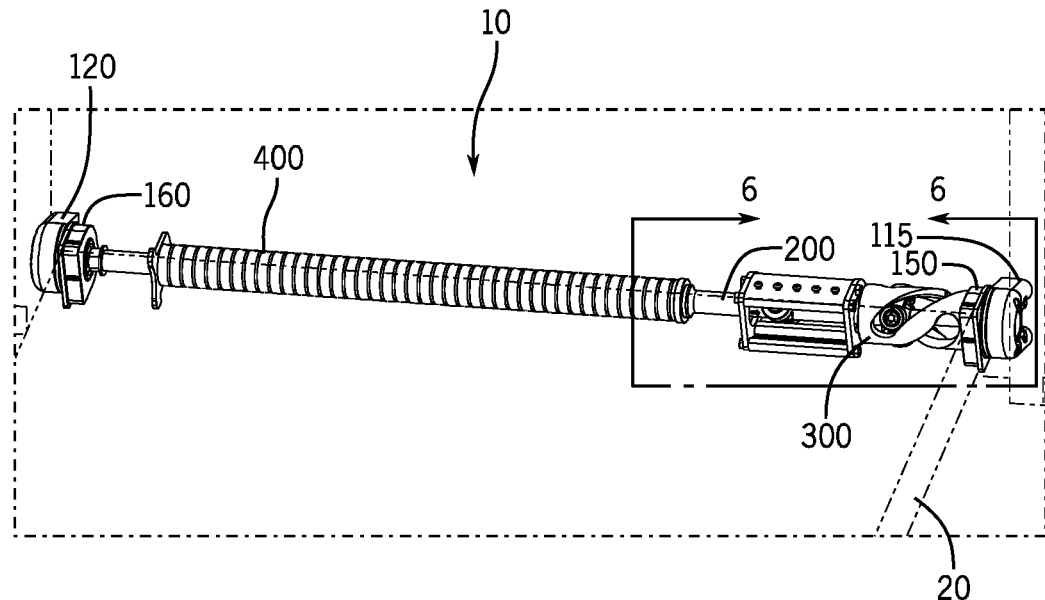
FIG. 5 is a view of the ramp fully deployed.
Figure 6:
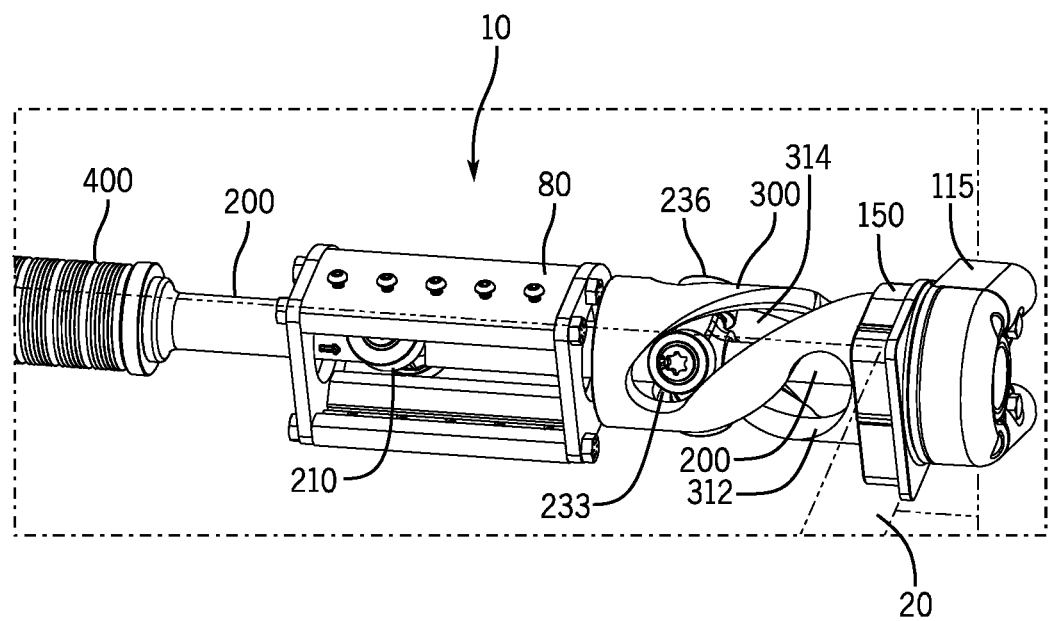
FIG. 6 is a view of the counterbalance hinge assembly of the trailer with the ramp fully deployed.
Figure 9:
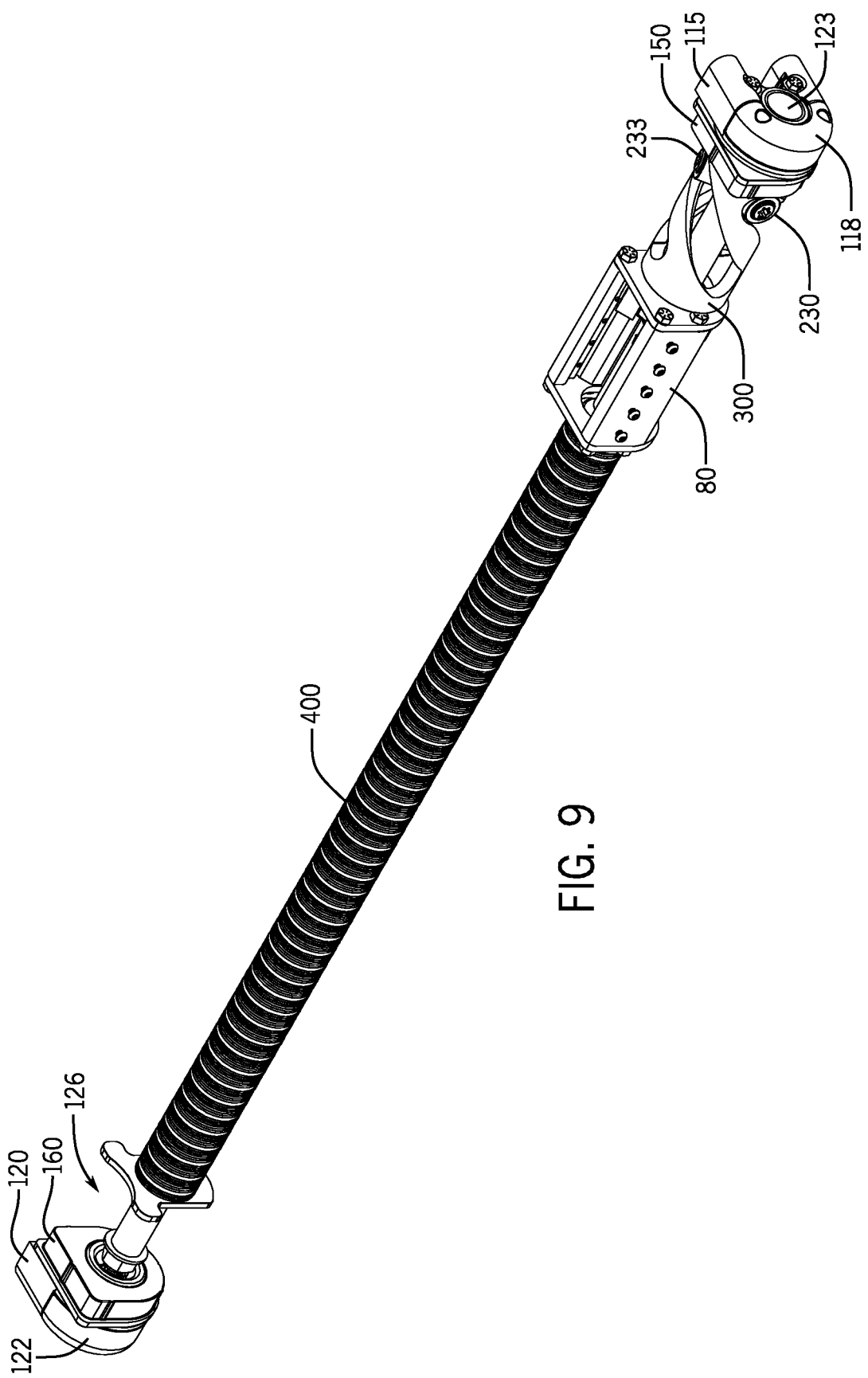
FIG. 9 is a perspective view of the counterbalance hinge assembly with the housing removed.
Figure 10:
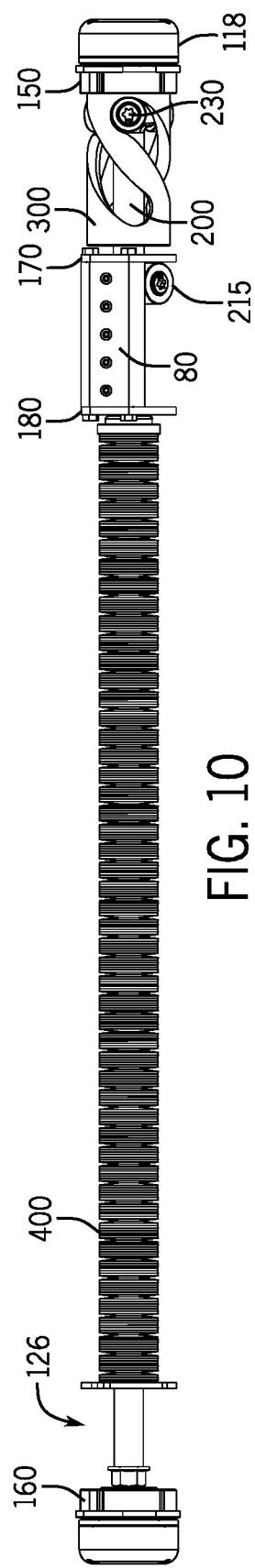
FIG. 10 is a front view of the counterbalance hinge assembly with the housing removed.
Figure 11:
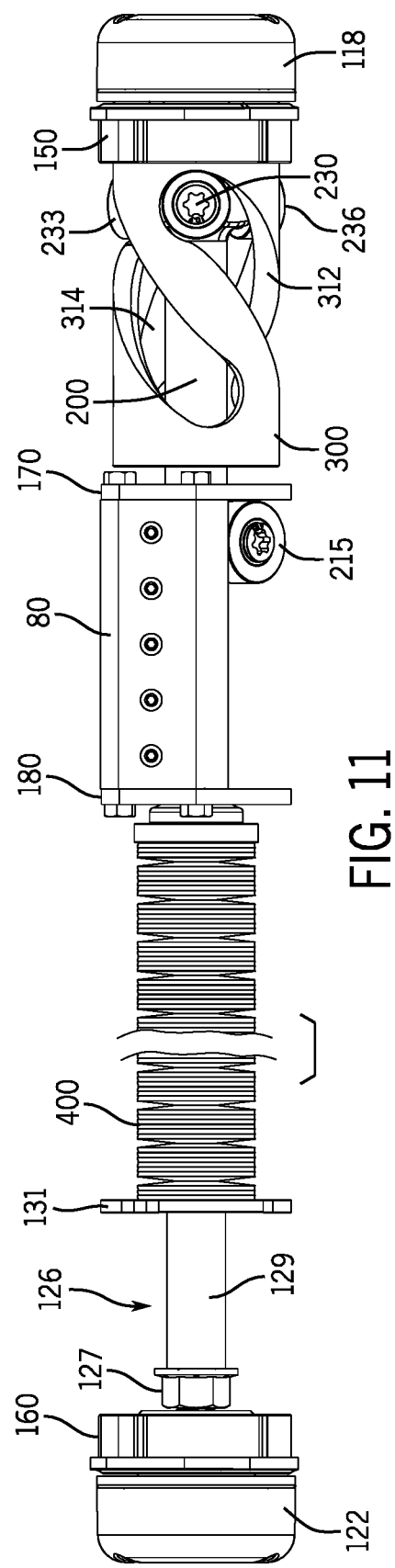
FIG. 11 is a partial view of the counterbalance hinge assembly with the housing removed.
Figure 14:
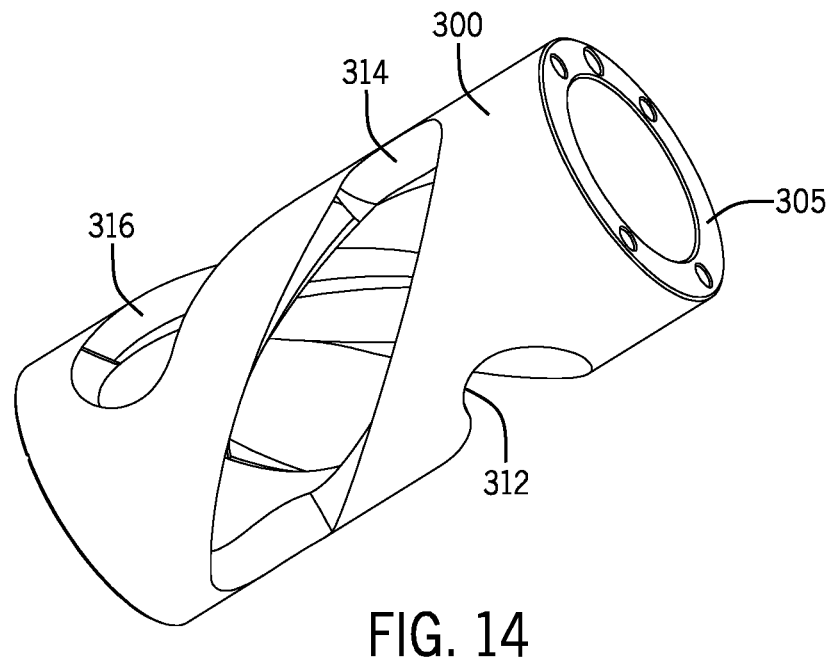
FIG. 14 is a view of the cam.
Figure 15:
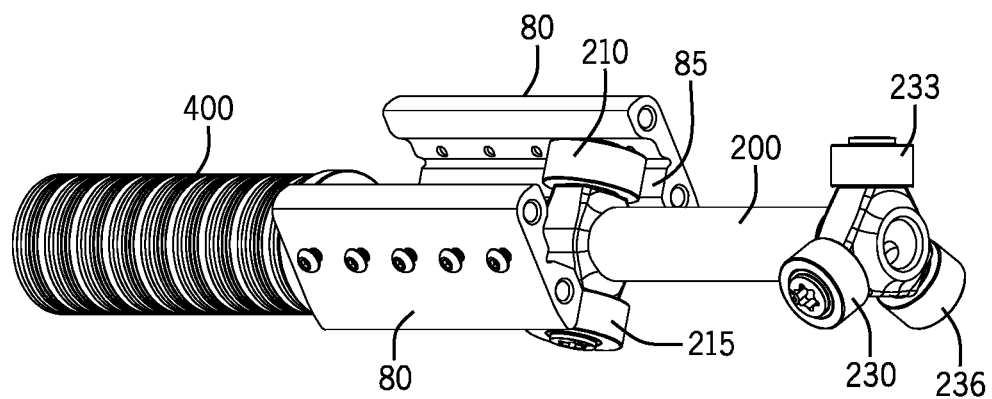
FIG. 15 is a view of the cam follower holder and cam followers.

FIGS. 1 and 2 show the moveable member 20 in a stowed position. In this example, the moveable member 20 is a ramp that extends below 90 degrees to contact the ground. FIGS. 3 and 4 show the moveable member 20 in a partially deployed position. FIGS. 5 and 6 shows the moveable member 20 in a deployed position. The counterbalance hinge assembly 10 at least partially supports or buffers a weight of moveable member 20 as the moveable member 20 moves from the stowed positioned to deployed position.

The counterbalance hinge assembly 10 includes a housing 60 that moves in conjunction with the moveable member 20. The housing 60 includes a shaft 100. A first end 105 of the shaft 100 rotates in a concentric manner with respect to a first fixed end support 115. As the housing 60 moves in conjunction with the moveable member 20, the shaft 100 likewise rotates. A second end 110 of the shaft 100 is rotatably engaged to the housing 60. The first fixed end support 115 and a second fixed end support 120 are positioned at or near the rear end 38 of the trailer. When the moveable member 20 moves upward or downward, the first fixed end support 115 and the second fixed end support 120 generally remain stationary, while the housing 60 moves along with the moveable member 20. The housing 60 generally encloses a portion of counterbalance hinge assembly 10 between the first fixed end support 115 and the second fixed end support 120. This protects and covers many of the moving components of the counterbalance hinge assembly 10. This provides a clean or finished appearance appear to the counterbalance hinge assembly 10. The housing 60 may further provide for attachment or engagement to the movable member 20. For example, the moveable member 20 may be welded or attached to the housing 60.

The counterbalance hinge assembly 10 further includes a cam follower holder 200, a cam 300, and a compression device 400 that assist the moveable member 20 when moving between the stowed and deployed positions. The cam follower holder 200 moves laterally and rotates relative to the cam 300. The cam follower holder 200 provides a linear or axial force against the compression device 400. The compression device 400 biases against the cam follower holder 200 to assist in moving between the stowed and deployed positions. The compression device 400 may be adjusted to partially support or buffer the weight of moveable member 20 as the moveable member 20 moves from the stowed position to the deployed position and vice versa.

The first fixed end support 115 and the second fixed end support 120 are positioned at or near the rear end 38 of the trailer. In this aspect, the first fixed end support 115 includes passages 116 for bolts that affix the first fixed end support 115 to the end 38 of the trailer. Similarly, the second fixed end support 120 includes passages 121 for bolts that affix the second fixed end support 120 to the end 38 of the trailer. The first fixed end support 115 and the second fixed end support 120 are affixed in rigid manner at or near the rear end 38 of the trailer. In this aspect, the passages 116 are 121 are generally perpendicular to an axis of rotation of the shaft 100. In this aspect, a first cover 118 is over the passages 116, and a second cover 122 is over the passages 121.

With respect to FIG. 1, the proximal side 40 of the moveable member 20 is engaged to the counterbalance hinge assembly 10. The proximal side 40 may be welded, bolted, or otherwise fixedly engages to a top surface 66 or other outer surface of the housing 60. With respect to FIG. 7, the top surface 66 of the housing 60 includes a flange 68 that provides support and a welding surface for the moveable member 20. The flange 68 extends upward from the top surface 66.

In this aspect, the housing 60 includes cam follower guides 80 to drive a cam follower holder 200. The cam follower guides 80 may be positioned generally parallel to an axis of rotation of the housing 60. The cam follower guides 80 may include a linear-shaped member positioned on an interior of the housing 60. The cam follower guides 80 are securely fastened or attached to the housing 60 and move in conjunction with the housing 60. In this aspect, the housing 60 generally encloses or conceals the cam follower holder 200, the cam 300, and the compression device 400.

A first support bearing 150 and a second support bearing 160 assist in providing rotation of the housing 60 with respect to the first fixed end support 115 and the second fixed end support 120. The first support bearing 150 is positioned in between a first end 62 of the housing 60 and a first lateral side 305 of the cam 300. With respect to FIGS. 19 and 21, a central opening 153 of the first support bearing 150 fits over the first lateral side 305 of the cam 300. The central opening 153 may include a circular shape that fits over a circular outer exterior of the first lateral side 305 of the cam 300. In operation, the first support bearing 150 moves with the housing 60 and rotates around the first lateral side 305 of the cam 300.

In this aspect, the first fixed end support 115 includes an extending portion 119 that fits through the central opening 153 and inside of the lateral side 305 of the cam 300. Bolts 320 pass through the first fixed end support 115 and into the lateral side 305 of the cam 300. The bolts 320 are generally arranged parallel to an axis of rotation of the shaft 100. As such, after assembly, the cam 300 is rigidly engaged to the first fixed end support 115.

The second support bearing 160 is positioned in between a second end 64 of the housing 60 and the second fixed end support 120. A central opening 163 of the second support bearing 160 fits over a circular inner portion 124 of the second fixed end support 120. In operation, the second support bearing 160 moves with the housing 60 and rotates around the circular inner portion 124 of the second fixed end support 120. The first and second support bearings 150 and 160 may be formed from a polymer or include a polymeric surface to reduce friction. A nut 127 threads to the second end 110 of the shaft 100.

The cam follower holder 200 is mounted to the shaft 100. In this aspect, as shown in FIG. 13, the cam follower holder 200 includes a central passage 205 that extends a width of the cam follower holder 200. The shaft 100 passes through the central passage 205 of the cam follower holder 200. In this aspect, the cam follower guides 80 are positioned on the interior of the housing 60 and are oriented generally parallel to the shaft 100. Thus, the movement of the housing 60 and the moveable 20 member is transferred to the cam follower holder 200.

In this aspect, the cam follower guides 80 are fixedly engaged to a first mounting plate 170 and a second mounting plate 180. The cam follower guides 80, the first mounting plate 170, and the second mounting plate 180 form a cage-like structure that assists in transferring the load to the housing 60. Rear surfaces 88 of the cam follower guides 80 may bolt to inner surfaces of the housing 60. End surfaces 90 of the cam follower guides 80 may bolt to the first mounting plate 170 and the second mounting plate 180. The first mounting plate 170 includes an opening 172. The second mounting plate 180 includes an opening 182. The shaft 100 passes through the opening 172 and the opening 182.

In this aspect, the cam follower holder 200 rotates in unison with the shaft 100 and moves laterally with respect to the shaft 100. In this aspect, the cam follower holder 200 includes two cam followers 210 and 215. As the cam follower guides 80 rotate with the housing 60, contact surfaces 85 of the cam follower guides 80 drive against the two cam followers 210 and 215, which causes rotation of the cam follower holder 200. The cam followers 210 and 215 are mounted in a fixed position on the cam follower holder 200. In this aspect, the cam followers 210 and 215 include a movable outer race portion.

With respect to FIG. 13, the cam follower holder 200 includes a first lateral side 242 and a second lateral side 248. The compression device 400 biases against the second lateral side 248 of the cam follower holder 200. When the moveable member 20 is in the stowed position, the compression device 400 is compressed and is biasing against the second lateral side 248 of the cam follower holder 200. In the stowed position, the compression device applies a force against the second lateral side 248 of the cam follower holder 200. When the moveable member 20 is in the stowed position, the compression device 400 has released at least a portion of its bias against the second lateral side 248 of the cam follower holder 200.

First thrust bearings 152 may be positioned between the first end 105 of the shaft 100 and the first fixed end support 115. Second thrust bearings 158 may be positioned between the compression device 400 and the cam follower holder 200.

The cam 300 is engaged to the first fixed end support 115. In this aspect, the cam 300 is rigidly engaged to the first fixed end support 115. In other aspects, the cam 300 may be engaged to other fixed portions of the counterbalance hinge assembly 10 or other fixed portions of the rear end 38 of the trailer. The cam 300 remains stationary in the interior of the housing 60 of the counterbalance hinge assembly 10 while the housing 60 rotates. As such, the housing 60 may rotate around the cam 300. A portion of the cam follower holder 200 rotates in an interior of the cam 300.

In this aspect, the cam follower holder 200 includes three cam followers 230, 233, and 236. The cam followers 230, 233, and 236 are mounted in a fixed position on the cam follower holder 200. In this aspect, the cam followers 230, 233, and 236 include a movable outer race portion. In other aspects, fewer or additional cam followers may be employed. For example, the cam follower holder 200 may include one, two, or four or more cam followers. The three cam followers 230, 233, and 236 engage with slots of the cam 300, or, in other aspects, three cam followers 230, 233, and 236 engage with cam surfaces of other cams.

The cam 300 may include any number of slots. The number of slots used with the cam 300 may depend on user preference, the size and weight of the moveable member 20, the desired operating performance, other variables, etc. In the example of the present Figures, the cam 300 includes three slots 312, 314, and 316. As described above, the cam 300 may include one slot, two slots, three slots, or four or more slots. The three cam followers 230, 233, and 236 of the cam follower holder 200 travel in the three slots 312, 314, and 316. Each of the three slots 312, 314, and 316 includes a length of travel for the three cam followers 230, 233, and 236. In this aspect, the slots 312, 314, and 316 include a stowed end and a deployed end at opposed ends of the slots 312, 314, and 316. In this aspect, the sidewalls of the slots 312, 314, and 316 are shaped to accommodate forces generated during movement of the moveable member 20.

In other aspects, the cam 300 includes grooves or tracks in its interior that receives one or more of the cam followers 230, 233, and 236 or other cam followers. Such grooves or tracks may only be formed in an inner portion or inner surface of the cam 300, such that the grooves or tracks do not pass completely through walls of the cam 300. In other aspects, the cam 300 includes cam surfaces that receive the cam followers 230, 233, and 236 or other cam followers. The cam surfaces may share a similar varying angle of incline as the slots 312, 314, and 316. In other aspects, the cam surfaces may also include a linear or a constant incline. In this aspect, the cam followers 230, 233, and 236 or other cam followers drive or bear against the cam surfaces.

The slots 312, 314, and 316 in the cam 300 are shaped and configured to neutralize and/or counterbalance the forced required to open and close the moveable member 20. As the moveable member 20 moves downward from the stowed position to the deployed position, the moveable member 20 generates increasing torque from the weight of the moveable member 20, and the counterbalance hinge assembly 10 buffers this torque with the compression device 400 to provide controlled movement to the deployed position. The counterbalance hinge assembly 10 balances the torque generated from moving the moveable member 20 to the deployed position. The counterbalance hinge assembly 10 may be configured to prevent the moveable member 20 from accelerating at too rapid of a rate to the deployed position. The counterbalance hinge assembly 10 may be configured to move the moveable member 20 to stowed or deployed positions with a minimal, consistent force. In aspect depicted, the counterbalance hinge assembly 10 allows the operator to move the moveable member 20 to and from the stowed and deployed positions with a pulling (opening) force and pushing (closing) force from a single finger of the operator.

Each of the slots 312, 314, and 316 includes a length of travel for the cam followers 230, 233, and 236. In this aspect, the slots 312, 314, and 316 include the stowed end and the deployed end. In this aspect, the walls of the slots 312, 314, and 316 are shaped to accommodate forces generated during movement of the moveable member 20. The slots 312, 314, and 316 have less angle when the torque generated by the moveable member 20 will be higher such that the compression device 400 counterbalances the torque. When the torque levels from the moveable member 20 are higher, the rotational movement will have to compress the compression device 400 to a greater extent in order to continue the rotational movement of the cam follower holder 200.

The counterbalance hinge assembly 10 transfers the torque from the moveable member 20 to a linear force that compresses or urges against the compression device 400. As the compression device 400 is compressed, energy is stored in the compression device 400, and the stored energy may be later used to raise or assist in raising the moveable member 20. Thus, the movement downward of the moveable member 20 in a first direction stores energy in the compression device 400, and the movement upward of the moveable member 20 in a second direction is assisted by the stored energy in the compression device 400. Thus, the stored energy in the compression device 400 from the downward movement of the moveable member 20 may be used to assist in raising the moveable member 20 upward.

Figure 17:
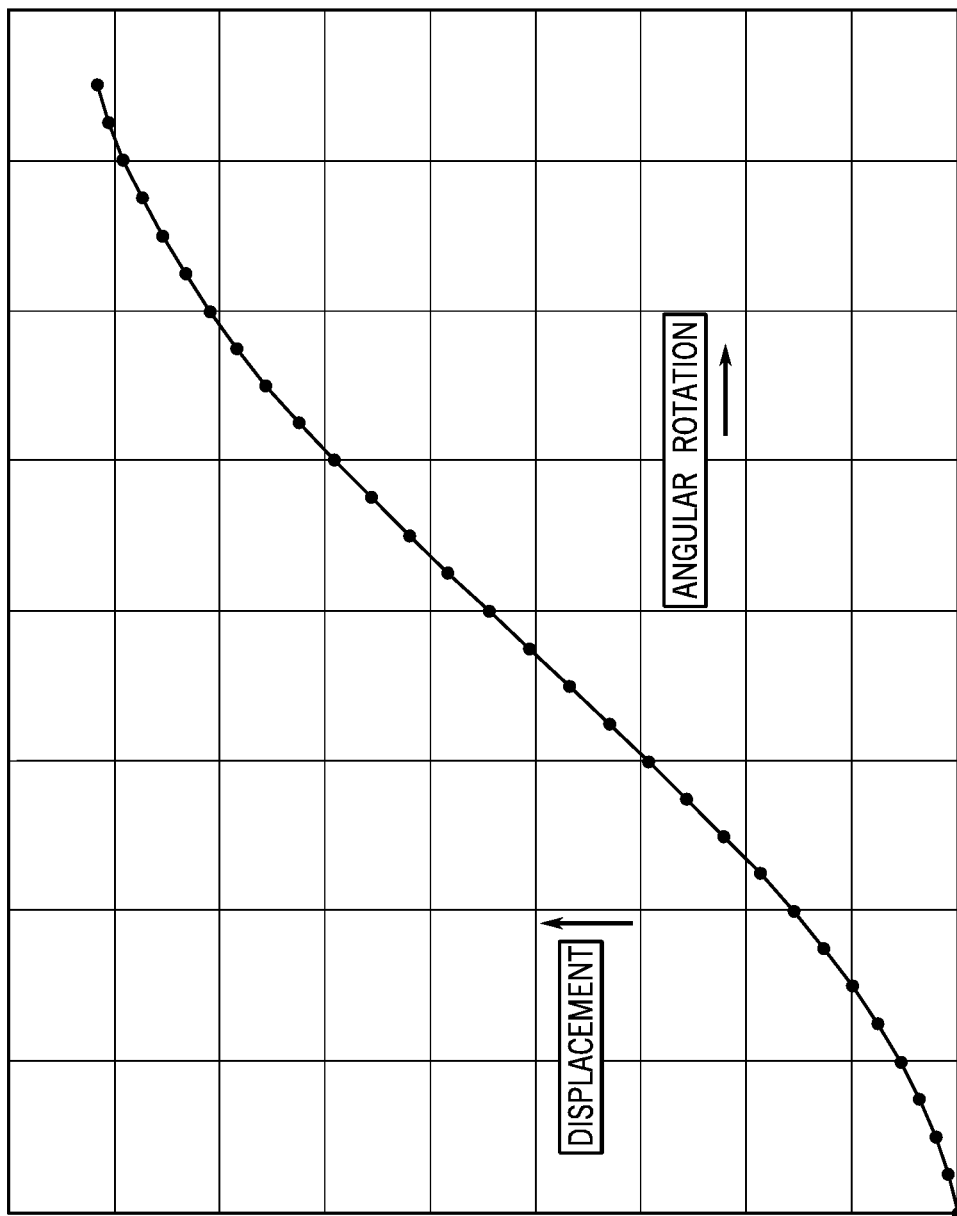
FIG. 17 is a graph showing the varying angle of incline of the slots.
Figure 18:
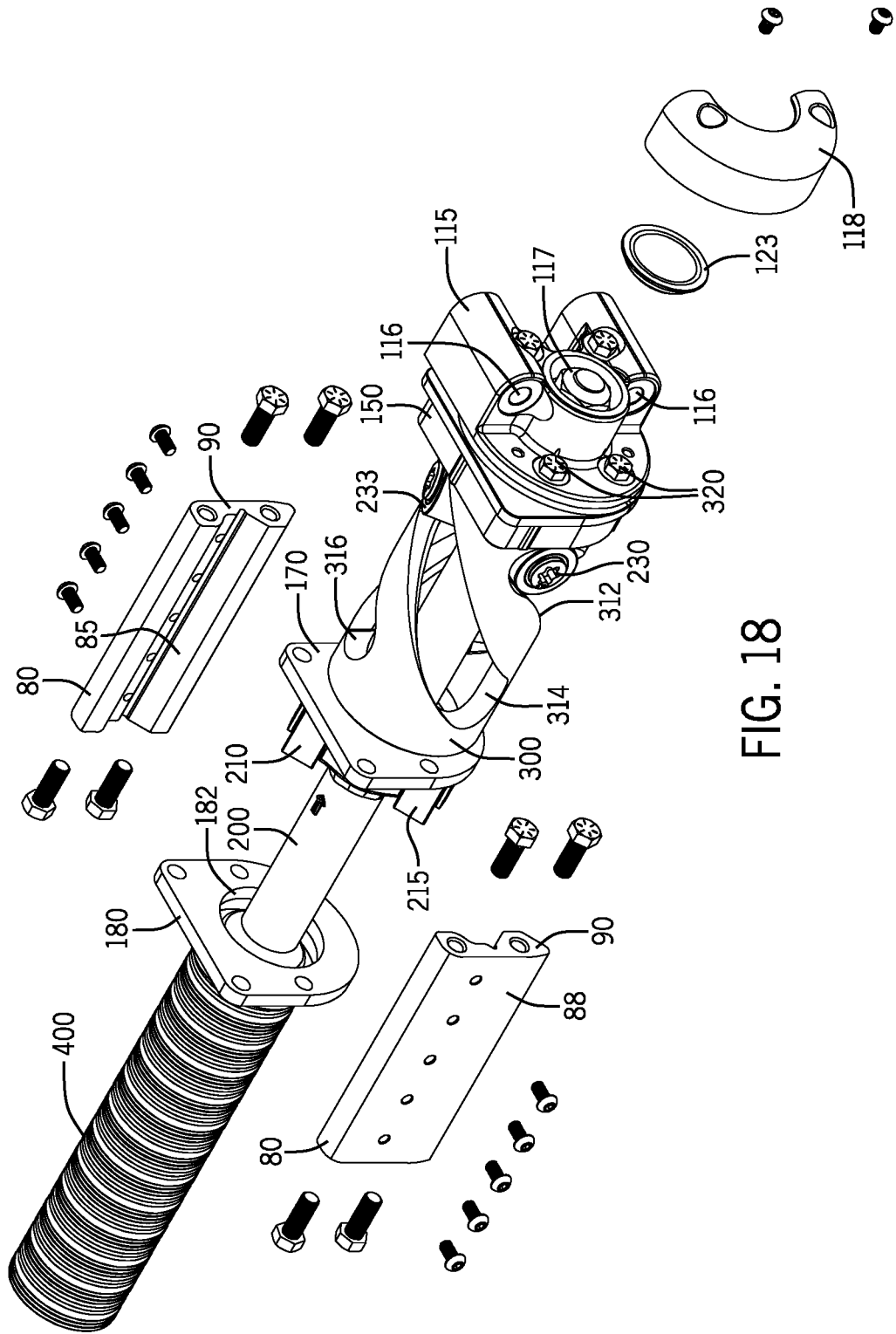
FIG. 18 is an exploded view of the counterbalance hinge assembly.
Figure 19:
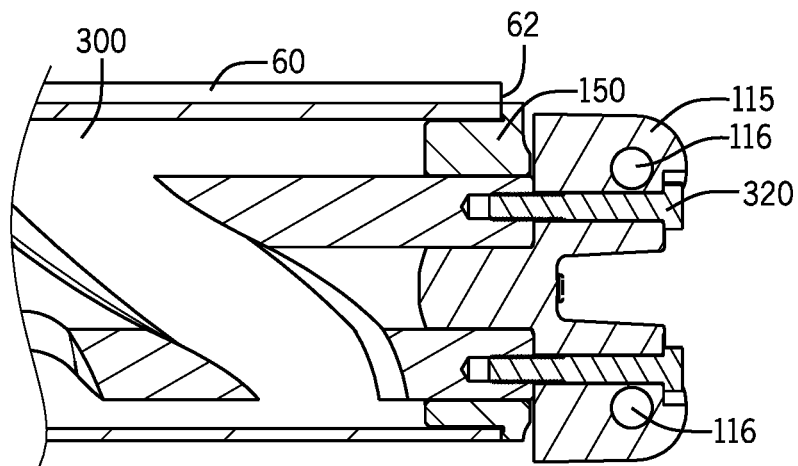
FIG. 19 is a sectional view showing the right support bearing.
Figure 20:
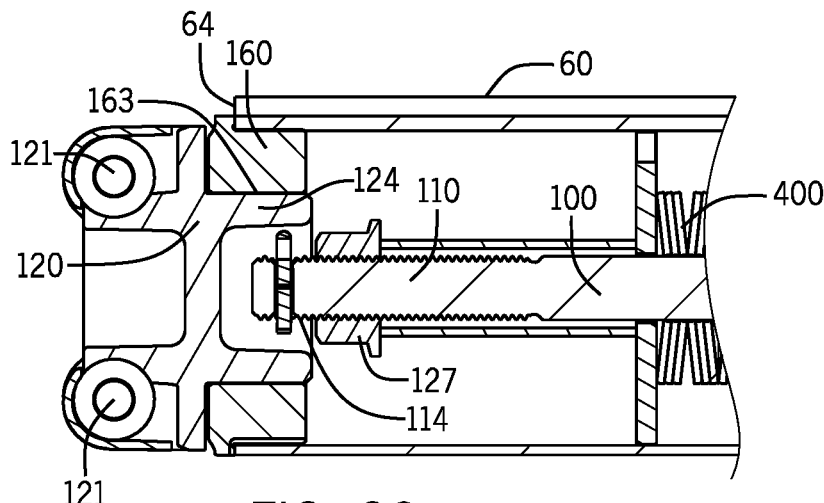
FIG. 20 is a sectional view showing the left support bearing.
Figure 21:
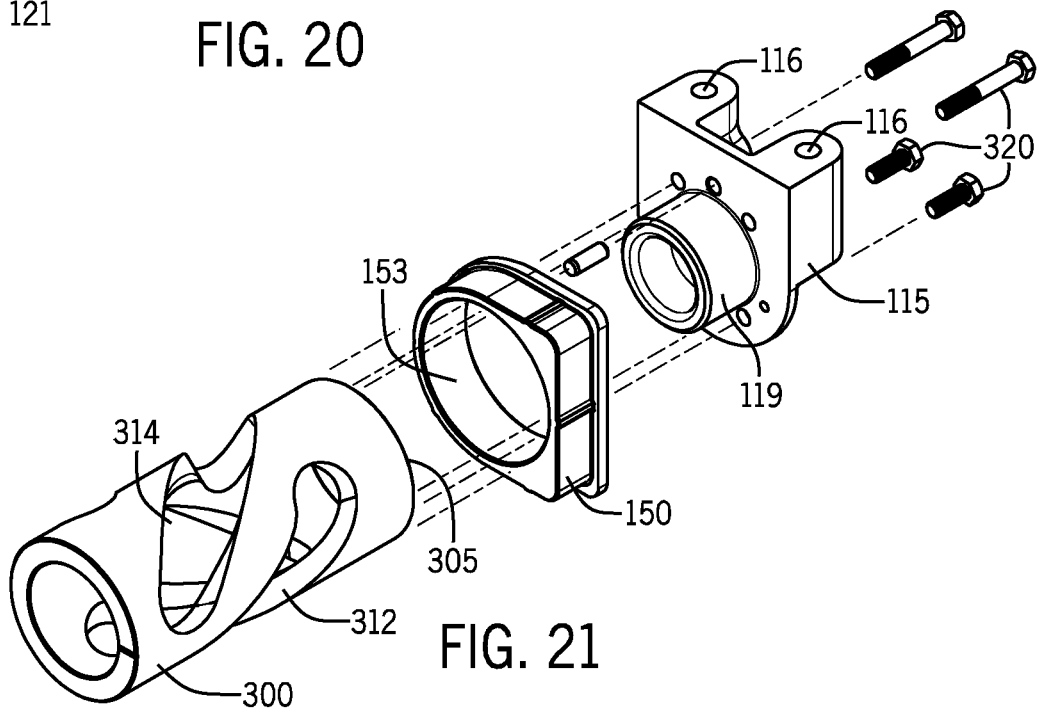
FIG. 21 is an exploded view of the right end of counterbalance hinge assembly.

In this aspect, the slots 312, 314, and 316 may include an angle of incline of approximately 55 degrees to approximately 85 degrees at the stowed end, an angle of incline of approximately 15 degrees to approximately 45 degrees in a middle section, and an angle of incline of approximately 45 degrees to approximately 75 at and approaching the deployed end. In the aspect of the present Figures, the slots 312, 314, and 316 include an angle of incline of approximately 70 degrees at the stowed end, an angle of incline of approximately 30 degrees in a middle section, and an angle of incline of approximately 60 degrees at and approaching the deployed end. The slots 312, 314, and 316 are not limited to these specific angles of incline. The slots 312, 314, and 316 may be modified to have different angle of inclines to correspond to the torque forces generated by the moving of the particular moveable member 20, which vary as the moveable member 20 moves from the stowed position to the deployed position. As shown in FIG. 17, the angle of incline includes three main sections in an approximately high— low— high pattern (with the second high being lower than the first high).

In other aspects, different angles of incline may be employed. In other aspects, the slots 312, 314, and 316 may include a first angle of incline that is high, which is followed by a second angle of incline that is low and that continues until the moveable member 20 is in the deployed position. The slots 312, 314, and 316 may be modified to have different angle of inclines to correspond to different applications and user preference. The slots 312, 314, and 316 may also be modified to have two or 4 or more different angles of incline to correspond to different applications and user preference. The slots 312, 314, and 316 may also be modified to have a single or constant angle of incline to correspond to different applications and user preference.

The counterbalance hinge assembly 10 includes two sets of cam followers that engage with different components and provide different function. The rotation of the housing 60 causes the cam follower guides 80 of the housing 60 to engage with the cam followers 210 and 215, which causes rotation of the cam follower holder 200. The cam followers 230, 233, and 236 engage with the slots 312, 314, and 316 of the cam 300, which drives the lateral movement of the cam follower holder 200 on the shaft 100 and against the compression device 400.

As the moveable member 20 moves downward from the stowed position to the deployed position, the moveable member 20 generates torque from the weight of the moveable member 20. The counterbalance hinge assembly 10 transfers the torque to a linear force that compresses the compression device 400. The counterbalance hinge assembly 10 stores the torque or energy in the compression device 400. The compression device 400 includes a compressed configuration and a relaxed configuration. In the compressed configuration, the stored energy in the compression device 400 biases the moveable member 20 to an upward position or a storage position. The stored energy in the compression device 400 assists in the rotation of the moveable member 20 upward or to the stowed position.

With reference to FIG. 13, in this aspect, the first fixed end support 115 receives the first end 105 of the shaft 100. In this aspect, a hex head 117 is engaged the first end 105 of the shaft 100. The hex head 117 may be permanently attached to the first end 105 of the shaft 100 via welding or the like. In certain aspects, the hex head 117 may be an integral portion of the shaft 100. A dust cover 123 may be removed in order to adjust the hex head 117 with a wrench, socket, or the like. During assembly, the nut 127 is threaded to the threaded exterior 114 of the shaft 100 at the second end 110 of the shaft 100. In this aspect, the compression force applied to the cam follower holder 200 maybe adjusted by loosening or tightening the hex head 117. With respect to FIGS. 9 and 10, as the hex head 117 is tightened, a nut plate assembly 126 is moved to the right, and the compression device 400 is further biased, thus adding additional force against the cam follower holder 200. The nut plate assembly 126 includes the nut 127, a tube 129, and a spring holding plate 131. In this aspect, the second end 110 of the shaft 100 is rotatably engaged to the nut plate assembly 126. In this aspect, the spring holding plate 131 is positioned between the compression device 400 and the nut 127. In this aspect, the nut plate assembly includes the nut 127, the tube 129, and the spring holding plate 131 welded or formed together in an integral fashion. Similarly, the hex head 117 may be loosened, which withdraws the nut 127 from the shaft 100 and moves the nut assembly 126 to the left, thus reducing a compression force against the cam follower holder 200.

The counterbalance hinge assembly 10 minimizes the physical, electrical, electro-mechanical or mechanical force required to move the moveable member 20 to the deployed or stowed position. The counterbalance hinge assembly 10 uses an applied counterbalance force from the compression device 400, which may include, for example, a spring or combinations of springs. The compression device 400 is not limited to springs, or types of springs. The compression device 400 may include other biasing members that are compressed by a linear force. Pneumatics, hydraulics, and/or combinations thereof may be used with or without the springs as the compression device 400 that biases the cam follower holder 200. Gas pistons, liquid pistons, and/or combinations thereof may be used with or without the springs as the compression device 400 that biases the cam follower holder 200.

The cam follower holder 200 transitions the applied counterbalance force into the cam 300. The slots 312, 314, and 316 in the cam assembly maintain an approximately equal counterbalance to the moveable member 20's increasing torsional weight throughout rotation until approximately 90° in the deployed state. These components interface to a fixing point including an opposite end fixing point that is bridged by the moveable member 20 that is free to rotate via rotational devices connecting to the first and second fixed end supports 115 and 120.

As the moveable member 20 rotates to the deployed position, the cam follower holder 200 drives against the cam 300 causing lateral movement of the cam follower holder 200 against the compression device 400 further compressing the compression device 400 to generally maintain equilibrium between the torque of the moveable member 20, which is increasing due to the changing center of gravity of the moveable member 20 during rotation. This is accomplished through the slots 312, 314, and 316 configured in the cam 300 compensating for weight increase as the moveable member 20 rotates to the deployed position by controlling varying cam angles. As the cam follower holder 200 passes the approximate 90° to the deployed position, the cam slot angles decrease to compensate for the slight decrease in torque of the moveable member 20 to maintain a slightly negative counterbalance to allow the moveable member 20 to slowly travel to final deployed position without external input other than gravity. This is done to prevent the moveable member 20 from stalling after 90° and not moving to the full deployed angle. The decreased cam slot angle after 90° also helps to maintain the moveable member 20 in the fully deployed position and helps to mitigate unwanted upward movement caused by wind, the movement of gear or vehicles over the moveable member, the ingress/egress of personnel, etc.

In this aspect, a stack of disc washers forms the compression device 400. Disc washers may also be commonly called a Belleville washer, a coned-disc spring, a conical spring washer, and a disc spring. The number and arrangement of disc washers may be varied depending on the size of the moveable member 20, the amount of rotation needed for the moveable member 20, and/or the desired operator force required to move the moveable member 20. The number and arrangement of disc washers may be varied depending upon the spring rate of the disc washers used. The number and arrangement of disc washers may be varied depending on the size, type, and/or style of the disc washers. In this aspect, the disc washers each include a central opening and the shaft 100 is passed through the central openings. The disc washers may be employed in stacks of disc washers in parallel, series, and/or combinations thereof. The stacks of disc washers may include a plurality of the same disc washers or a combination of different types of disc washers. As noted above, different types of springs may be used as the compression device 400. For example, one or more coil springs may be used as the compression device 400 or used in conjunction with disc washers or other bias inducing members.

In the deploying (lowering) of the moveable member 20 from the secured position (reference 0°) to a deploying angle of approximately 85° to 95°, the counterbalance hinge assembly 10 is capable of maintaining a neutralizing force to the moveable member 20 (force can be adjusted (−) to allow slight freefall (lowering), which will require more(+) force applied to move to the stowed position (lifting) or vice versa) on the moveable member 20, and a small amount of external force (+) is used to move in either deploy or stow direction. The counterbalance hinge assembly 10 accommodates for increased force generated by the moveable member 20 angle change to the approximate 90° angle. An angle greater than the approximate 90° angle is where the hinge force to the moveable member 20 transitions allowing the moveable member 20 to move slowly, on its own, toward the fully deployed position. At the fully deployed position, the moveable member 20 may have rotated approximately 90° for a platform and approximately up to 125° for a ramp. In the ramp aspect, the ramp may be rotated until the distal side contacts the ground or other support. The rotation amounts are not limited to 90° or 125°, and depend on the initial stowed angle of the moveable member 20.

The above description for deploying (lowering) is reversed for stowing (lifting) process of the moveable member 20. The force required to initial lifting of the moveable member 20 toward the stowed position is typically slightly more from an angle greater than approximated 90° compared to an angle less than the approximate 90° neutral zone. Once lifted to an angle less than the approximate 90° angle, the lift force becomes less depending on counterbalance hinge adjustment mentioned above for (−) or (+) factor of hinge neutral counterbalance.

In one example, the moveable member 20 includes a ramp with a height of 76.5 inches, a width of 63.5 inches, a thickness of 1.75 inches, and a weight of 104 pounds. The compression device 400 includes 100 series washer stack having a spring rate of approximately 1000 pounds/inch. This combination of the moveable member 20 and compression device 400 provide smooth opening and closing with a user applied force pulling or pushing force of approximately 5 pounds to approximately 40 pounds. Of course, the required pulling or pushing may be adjusted by changing the compression device 400, modulating the number of springs in the compression device 400, adjusting the compression device 400, adjusting the hex head 117, etc. The required pulling or pushing may be adjusted based on the weight of the ramp. FIG. 17 is a graph showing the of incline of the slots 312, 314, and 316 of this example.

Figure 16:
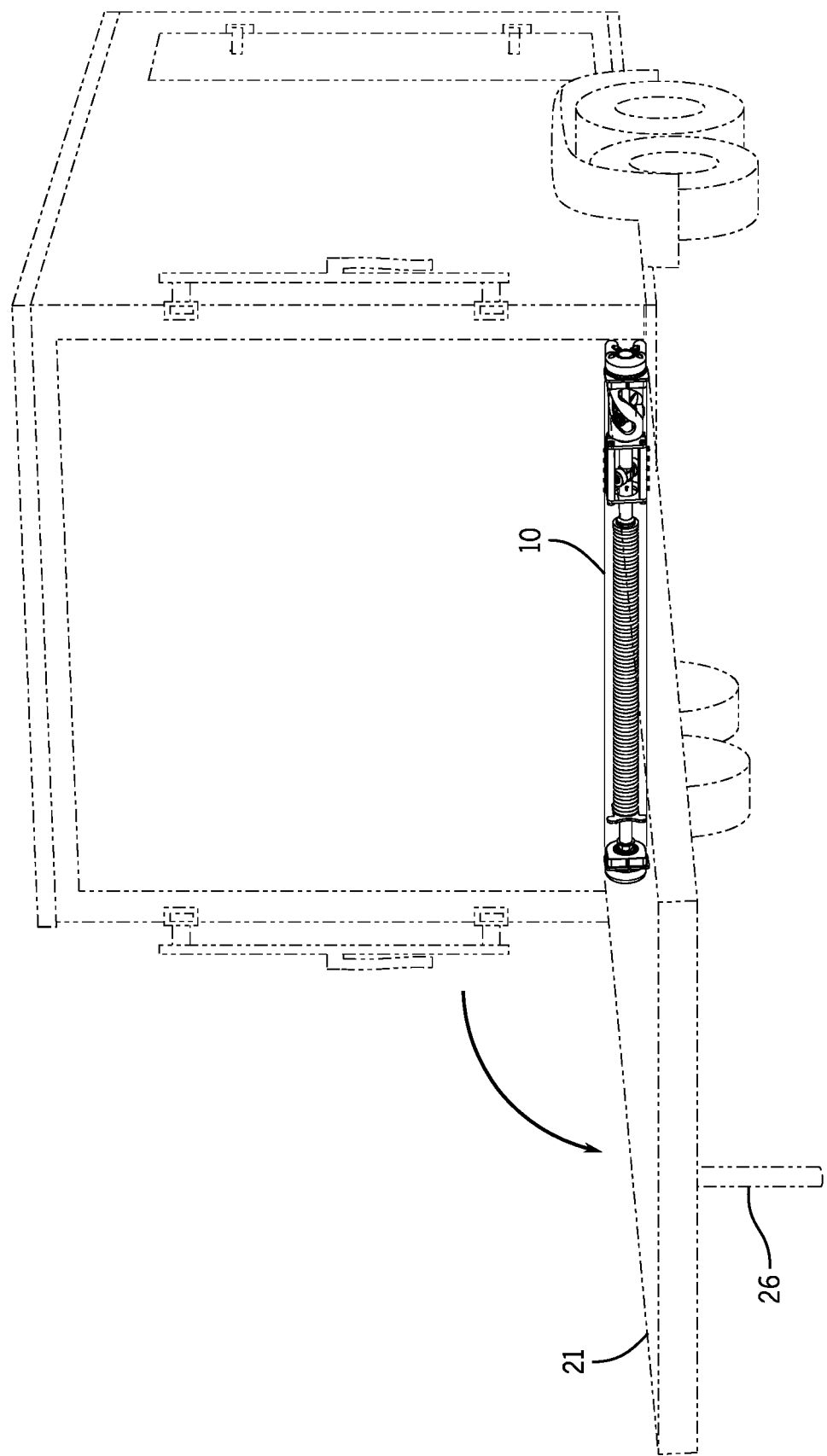
FIG. 16 is a view of the trailer with the deck in the deployed position.

FIG. 16 is a view of a trailer with a deck 21 in the deployed position. The counterbalance hinge assembly 10 hingedly engages the deck 21 to the trailer. The deck 21 includes deployable footings 26 to support the deck 21 on the ground. The deck 21 is deployed at approximately 90 degrees.

The cam followers 210, 215, 230, 233, and 236 may include bearings, wheels, rollers, followers, etc. The cam followers 210, 215, 230, 233, and 236 may include a fixed portion that engages the cam follower holder 200 and a movable portion that rotates against the slots 312, 314, and 316 or other track or cam surfaces.

Although the counterbalance hinge assembly 10 was primarily described herein with respect to trailers and vehicular use—with the trailer or vehicle acting a as the support with the ramp, platform, deck, door, etc. acting as the moveable member 20, the counterbalance hinge assembly 10 is not limited to a particular application and may be used with any of a variety of moveable members 20 attached or engaged to any of a variety of supports, in any of a variety of different applications with a hinging style of movement. For example, the counterbalance hinge assembly 10 may be incorporated into a murphy-style bed, hatchbacks and bed covers for vehicles, industrial lids and closing structures on tanks, bins, compartments, etc., machinery with a moveable member (such as an industrial chop saw or other equipment with a vertically reciprocating or up-down movement), appliances (such as chest or deep freezers with a vertically opening door), etc.

Further, in other aspects, the relative movement of the cam 300 and the cam follower holder 200 may be reversed. For example, in other aspects, the cam 300 may be mounted to the housing 60 and the cam 300 rotates along with the housing 60 and the moveable member 20, while the cam follower holder 200 is mounted in a fixed and stationary position.

As described above, the first fixed end support 115 and the second fixed end support 120 are affixed in rigid manner at or near the rear end 38 of the trailer. Of course, the first fixed end support 115 and the second fixed end support 120 may also be affixed in rigid manner at a rear of a truck or other vehicle. In other aspects, the counterbalance hinge assembly 10 is affixed to the trailer or truck using a single support. For example, a single support may replace the first fixed end support 115 and the second fixed end support 120. Further, in other aspects, additional supports made be added to the first fixed end support 115 and the second fixed end support 120. Further, in other aspects, the first fixed end support 115 and the second fixed end support 120 may be moved from ends of the shaft 100 or housing 60 and positioned between the ends of the shaft 100 or housing 60. Further, in other aspects, the first fixed end support 115 and the second fixed end support 120 may be centrally positioned between the ends of the shaft 100 or housing 60.

Further, in other aspects, the slots 312, 314, and 316 may be modified to have a constant or linear angle of incline. The counterbalance hinge assembly 10, with such an arrangement, will provide a more constant force to assist in deploying or stowing the moveable member 20. The constant force may reduce the amount of force needed to stow or deploy the moveable member 20. Of course, the amount of force needed to stow or deploy the moveable member 20, when using a constant or a linear angle of incline, may vary as the moveable member 20 is moved through it range of motion. However, the counterbalance hinge assembly 10 with the linear or constant angle of incline may still find utility in providing a power-assist feature to the moveable member 20.

Further, in other aspects, the housing 60 may be generally or mostly omitted. Instead, the cam follower holder 200 may engage the moveable member 20 either directly or with a bracket, support, or other structure that structurally or mechanically engages or integrates the cam follower holder 200 and the moveable member 20.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A counterbalance hinge assembly, comprising:
a housing;
a first fixed end support; a second fixed end support;
the housing positioned between the first fixed end support and the second fixed end support;
the housing is configured to rotate relative to the first fixed end support and the second fixed end support;
a compression device is engaged to the housing, the compression device is configured to apply a bias to a rotation of the housing;
a cam follower holder, the cam follower holder comprising a first cam follower and a second cam follower;
the compression device biasing the cam follower holder;
a cam defining cam surfaces;
the housing is configured to drive against the first cam follower and impart a rotational force to the cam follower holder; and
the second cam follower is configured to drive against the cam surfaces of the cam to drive the cam follower holder against the bias of the compression device.

2. The counterbalance hinge assembly according to claim 1, wherein the counterbalance hinge assembly is configured to transfer rotational torque to a linear force.

3. The counterbalance hinge assembly according to claim 1, wherein the counterbalance hinge assembly is configured to transfer a rotational torque from a moveable member engaged to the housing to a linear force on the compression device.

4. The counterbalance hinge assembly according to claim 1, wherein the compression device comprises a compressed configuration and a relaxed configuration, wherein the compression device, in the compressed configuration, biases a moveable member engaged to the housing to an upward position or a storage position.

5. The counterbalance hinge assembly according to claim 1, wherein the compression device comprises a compressed configuration and a relaxed configuration, wherein the compression device, in the compressed configuration, biases a moveable member to an upward position or a storage position, and wherein the compression device, in the relaxed configuration biases the moveable member in the upward position or the storage position.

6. The counterbalance hinge assembly according to claim 1, wherein the first fixed end support and the second fixed end support are configured to engage a truck or trailer to hold the counterbalance hinge assembly to the truck or trailer, and wherein an outer surface of the housing is configured to secure to a moveable member.

7. The counterbalance hinge assembly according to claim 1, wherein the housing encloses a portion of counterbalance hinge assembly between the first fixed end support and the second fixed end support.

8. The counterbalance hinge assembly according to claim 1, wherein the bias applied to the housing by the compression device is adjustable.

9. The counterbalance hinge assembly according to claim 1, wherein a rotation of the housing in a first direction compresses the compression device and stores energy in the compression device.

10. The counterbalance hinge assembly according to claim 9, wherein the stored energy in the compression device assists in the rotation of the housing in a second direction.

11. The counterbalance hinge assembly according to claim 1, wherein a moveable member is configured to engage to the housing, the compression device is configured to compress and store energy when the moveable member moves downward, and the compression device is configured to use the stored energy to assist in moving the moveable member upward.

12. The counterbalance hinge assembly according to claim 1, wherein a moveable member is configured to engage to the housing, the compression device is configured to compress and store energy when the moveable member moves to a deployed position, and the compression device is configured to use the stored energy to assist in moving the moveable member to a storage position.

13. A counterbalance hinge assembly, comprising:
a housing;
a support;
the housing is rotatably engaged to the support;
the housing is configured to rotate in first and second directions relative to the support;
a compression device is engaged to the housing;
a rotation of the housing in the first direction transfers rotational torque to a linear force that compresses the compression device and stores energy in the compression device;
a cam follower holder, the cam follower holder comprising a first cam follower and a second cam follower;
the compression device biasing the cam follower holder;
a cam defining cam surfaces;
the housing is configured to drive against the first cam follower and impart a rotational force to the cam follower holder; and
the second cam follower is configured to drive against the cam surfaces of the cam to drive the cam follower holder against a bias of the compression device.

14. The counterbalance hinge assembly according to claim 13, wherein the stored energy in the compression devices assists in rotating the housing in the second direction.

15. A counterbalance hinge assembly, comprising:
a housing;
a cam follower holder, the cam follower holder comprising a first cam follower and a second cam follower;
a compression device biasing against the cam follower holder;
the cam follower holder configured to engage a moveable member;
a cam defining cam surfaces;
the housing is configured to drive against the first cam follower to impart a rotational force to the cam follower holder; and
the second cam follower is configured to drive against the cam surfaces of the cam to drive the cam follower holder against a bias of the compression device.

16. The counterbalance hinge assembly according to claim 15, wherein the counterbalance hinge assembly is configured to transfer a rotational torque from a movement of the moveable member to a linear force.

17. The counterbalance hinge assembly according to claim 16, wherein the linear force compresses the compression device.

18. A counterbalance hinge assembly, comprising:
a housing;
a support;
the housing configured to rotate in first and second directions relative to the support;
a cam follower holder, the cam follower holder comprising a first cam follower and a second cam follower;
a compression device biasing against the cam follower holder;
a cam defining cam surfaces;
the housing is configured to drive against the first cam follower and impart a rotational force to the cam follower holder; and
the second cam follower is configured to drive against the cam surfaces of the cam to drive the cam follower holder against a bias of the compression device.

19. The counterbalance hinge assembly according to claim 18, wherein the counterbalance hinge assembly is configured to engage and rotate a moveable member without external cables or a winch.

20. The counterbalance hinge assembly according to claim 18, wherein the housing comprises an outer surface, wherein the outer surface of the housing is configured to engage a moveable member to support the moveable member.

21. The counterbalance hinge assembly according to claim 18, wherein the housing encloses or conceals the cam follower holder, the cam, and the compression device.

* * * * *